US006779372B2

(12) United States Patent
Arlt et al.

(10) Patent No.: US 6,779,372 B2
(45) Date of Patent: Aug. 24, 2004

(54) MOTOR VEHICLE DOOR LOCK WITH A LOCK UNIT AND A CONTROL UNIT WHICH ARE SEPARATE FROM ONE ANOTHER

(75) Inventors: Horst Arlt, Wuelfrath (DE); Rainer Berger, Remscheld (DE); Bernhard Kordowski, Dortmund (DE); Bernd Weyerstall, Wuppertal (DE); Peter Bartel, Hattingen (DE); Edgar Budzynski, Dortmund (DE); Christian Lippold, Bochum (DE)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 10/184,051

(22) Filed: Jun. 28, 2002

(65) Prior Publication Data

US 2003/0070457 A1 Apr. 17, 2003

(30) Foreign Application Priority Data

Oct. 16, 2001 (DE) ........................................ 101 51 022

(51) Int. Cl.[7] .......................... B60R 25/00; E05B 65/12

(52) U.S. Cl. .................. 70/237; 70/256; 292/DIG. 23; 292/DIG. 25

(58) Field of Search .......................... 70/237, 255, 256; 292/DIG. 23, DIG. 25

(56) References Cited

U.S. PATENT DOCUMENTS 4,762,348 A * 8/1988 Matsumoto ................. 292/201
5,332,273 A * 7/1994 Komachi ................. 292/336.3
5,666,834 A * 9/1997 Inoue .......................... 70/237
5,732,988 A 3/1998 Mizuki
5,844,470 A 12/1998 Garnault et al.
5,901,991 A * 5/1999 Hugel et al. ................ 292/201

FOREIGN PATENT DOCUMENTS

DE G 90 11 530.9 U 11/1990
DE 44 44 581 A1 6/1995
DE 196 40 595 A1 4/1997
DE 196 22 310 A1 12/1997
DE 197 29 188 A1 1/1998
DE 196 42 698 C2 4/1998
DE 197 55 207 A1 6/1998
DE 197 28 967 A1 1/1999
DE 199 33 646 A1 1/2001
DE 199 44 968 A1 6/2001
EP 0 894 920 A1 2/1999

* cited by examiner

*Primary Examiner*—John B. Walsh
(74) *Attorney, Agent, or Firm*—Nixon Peabody LLP; David S. Safran

(57) ABSTRACT

A motor vehicle door lock with mechanical lock elements in a lock unit, the door lock includes a lock mechanism with several interacting elements in a control unit which is arranged at a location that is spatially separate from the lock unit in or on a motor vehicle door or hatch. The lock unit is connected to the control unit by a remote power transmission in the form of a Bowden cable, and the lock element in the lock unit can be mechanically actuated from an element of the lock mechanism in the control unit by the remote power transmission. In the lock unit, there is at least one component which is to be supplied with electricity to be triggered and/or to be interrogated, the at least one component is electrically connected by an electrical connecting element to lock electronics in the control unit, and the electrical connecting element is integrated into or combined with the mechanical power transmission.

6 Claims, 7 Drawing Sheets

MOTOR VEHICLE DOOR LOCK WITH A LOCK UNIT AND A CONTROL UNIT WHICH ARE SEPARATE FROM ONE ANOTHER

BACKGROUND OF THE INVENTION

1. Field of the Invention

This invention relates to a motor vehicle door lock. More specifically, the present invention relates to a door lock with a control unit separate from a lock unit.

The concept of motor vehicle door lock of this invention should be understood as encompassing not only side door locks and rear door locks, but also, for example, rear hatch locks. The concept of motor vehicle door lock of the present invention means the entire system with components that can also be arranged in a distributed manner.

2. Description of Related Art

Motor vehicle door locks are known in various embodiments. More and more often, motor vehicle door locks can be found with a central interlock drive, opening drive, auxiliary lock drive, driven entirely by electric motor. One example of such a motor vehicle door lock system can be found in published European Patent Application EP 0 894 920 A1, which includes lock elements and lock mechanism having a plurality of micro-switches and proximity sensors, especially Hall sensors, with signals which are evaluated and converted in the lock electronics.

In particular, in the lock mechanism and the lock electronics, the issue of moisture entry is important. The above-mentioned known motor vehicle door lock relates to special shielding measures.

A motor vehicle door or hatch has a damp space facing the outside door wall in which moisture enters from overhead at the window shaft in an amount that is often considerable, and a dry space that is generally sealed and separated from the damp space and is facing toward the inside of the motor vehicle door or hatch. The lock elements necessarily sit in the damp space as they are normally located on the end face of the motor vehicle door or hatch. In the dry space, there are electrical components such as, for example, a speaker, etc. The damp space/dry space separation has become known in, for example, electrical window raisers.

Also, as shown in published German Patent Application DE 44 44 581 A1, damp space/dry space separation has also been applied in a motor vehicle door lock. In this motor vehicle door lock there are mechanical lock elements, including lock latch and the detent pawl, combined in one lock unit in an encapsulated housing located in a damp space. In a dry space, on the other hand, a lock unit connected via Bowden cables to a separate control unit with an electric drive motor and lock electronics. In the dry space, there is also the inside door handle arrangement. The use of a remote power transmission means, such as the Bowden cable, which penetrates the damp/dry separation of the motor vehicle door or hatch, makes it possible to house the moisture-sensitive control unit in the dry space without adversely affecting the serviceability of the motor vehicle door lock overall.

However, in the prior art previously published, not less than five mechanical connections by the remote power transmission means and an undisclosed number of electrical connection elements are necessary. Accordingly, the associated cost is considerable with such door lock systems which prevents practical introduction of these motor vehicle door locks.

SUMMARY OF THE INVENTION

It is therefore an object of the invention is to optimize the above explained known concept of damp space/dry space separation for a motor vehicle door lock.

The invention is further described below using several embodiments shown in the drawings.

DETAILED DESCRIPTION OF THE INVENTION

Figure 1:
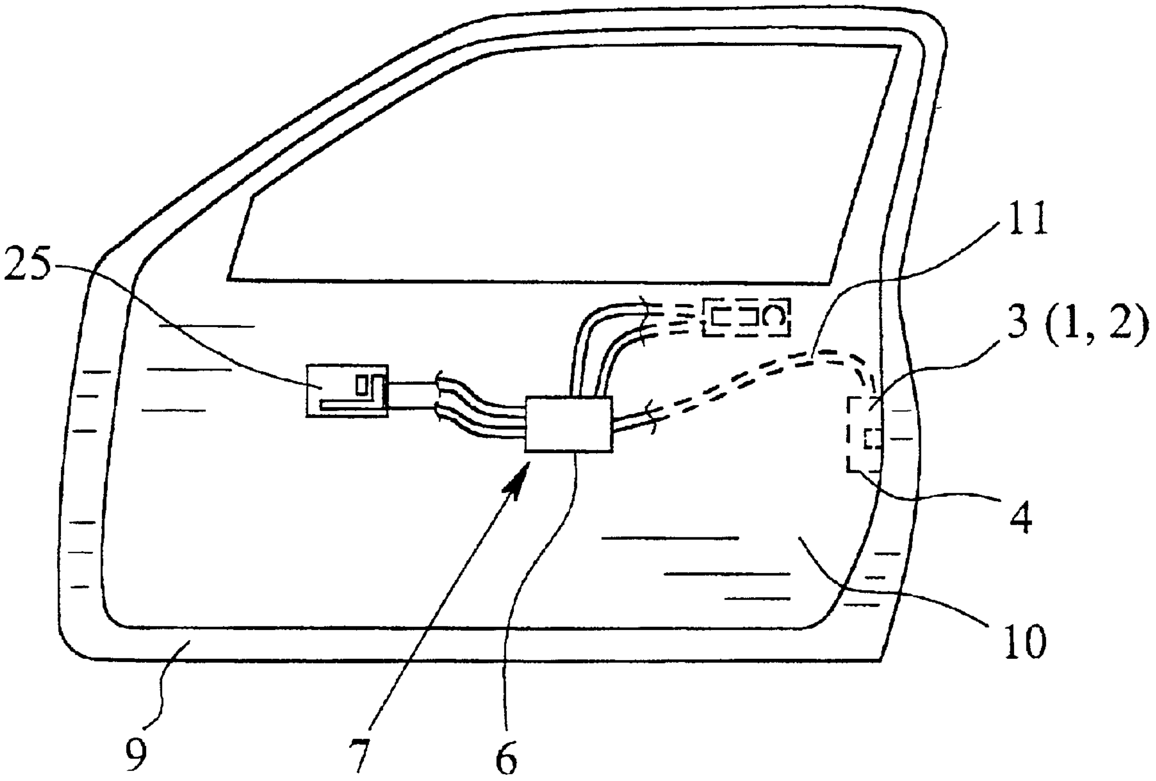
FIG. 1 shows a schematic of a two-part motor vehicle door lock with a lock unit in a damp space and a control unit in a dry space separate from the lock unit.
Figure 2:
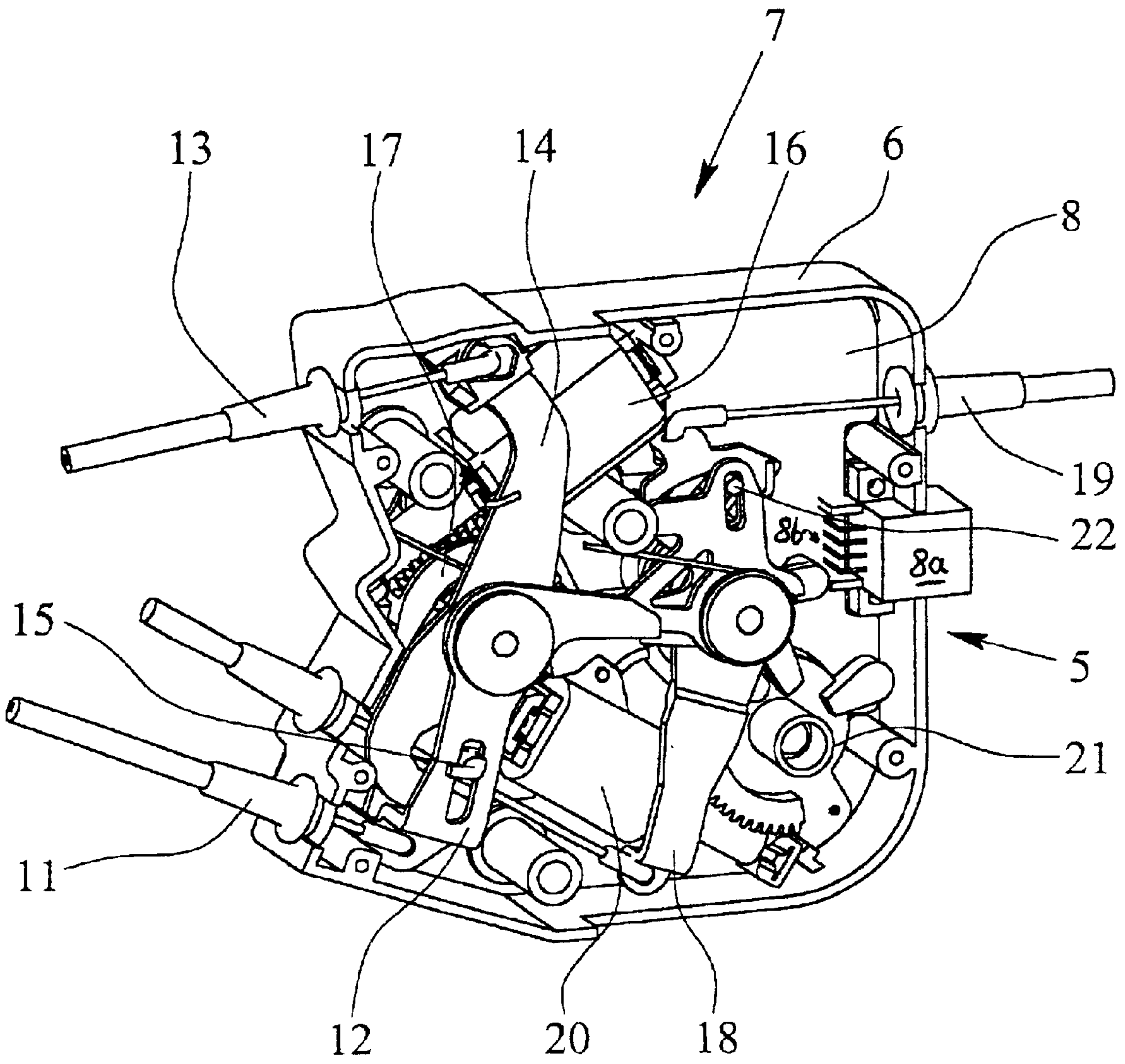
FIG. 2 shows an embodiment of the control unit of a motor vehicle door lock shown in FIG. 1.

FIG. 1 shows the basic concept of this invention, specifically a motor vehicle door lock with mechanical lock elements 1, 2, especially a lock latch 1 and detent pawl 2, in a lock unit 3, which are located here in a housing 4 which is well protected against the entry of moisture. Furthermore, FIG. 2 shows a lock mechanism 5 and a housing 6. Such a lock mechanism 5 generally has several interacting elements. This arrangement shown in FIG. 1 shows a control unit 7 spatially separated from the lock unit 3.

The motor vehicle door lock shown schematically in FIG. 1 is an example of a motor vehicle side door lock. Also, rear door locks, sliding door locks, hatch locks, or the like are encompassed and covered by this concept of a door lock of the present invention.

FIG. 2 indicates that, in the control unit 7, there are lock electronics 8, generally on a board inserted in the housing 6 of the control unit 7. In the control unit 7, there are also necessary micro-switches, sensors, etc. In FIG. 2, only the back of the board which carries the electronics is shown, together with an electrical connector **8*a* which connects to the electronics on the board via electrical leads 8*b***.

As previously mentioned, FIG. 1 illustrates the lock unit 3 being spaced apart from the control unit 7 in the motor vehicle door or hatch 9, and the lock unit 3 with the lock elements 1, 2 located in the damp space on the end face of the motor vehicle door or hatch 9. The control unit 7, on the other hand, is located on the other side of the damp/dry separation 10 in the dry space of the motor vehicle door or hatch 9.

The above described distributed arrangement of the components of the motor vehicle door lock has the aforementioned advantages, especially with respect to protection of the sensitive mechanical elements of the lock mechanism 5 and the lock electronics 8 against moisture.

Figure 3:
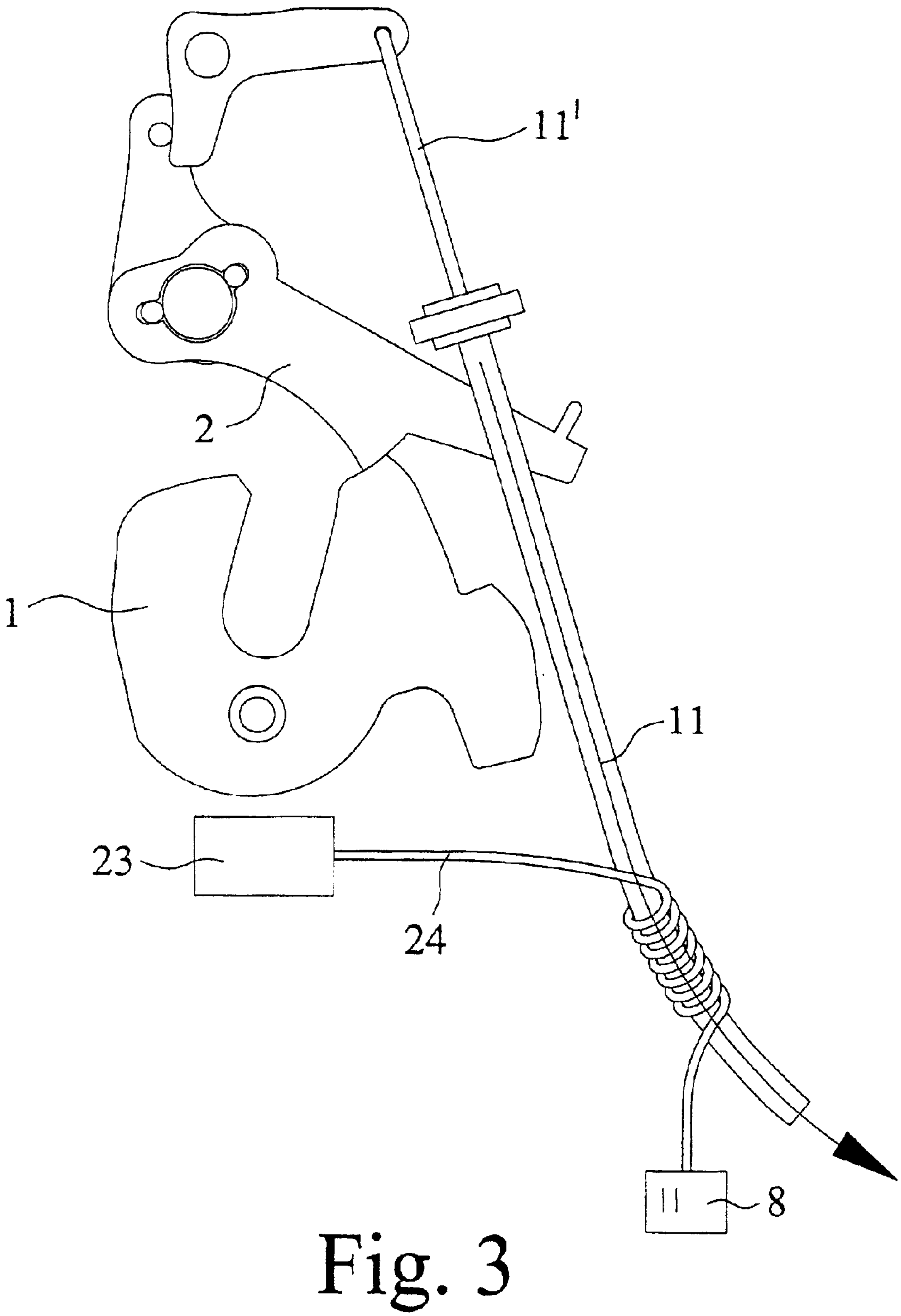
FIG. 3 shows details of a motor vehicle door lock in the FIG. 2 embodiment of the invention.

Of course, due to the concentration of electrical components in the control unit 7, the mechanical motion of the detent pawl 2 must be transferred over the distance between the lock unit 3 and the control unit 7. In this embodiment, and also in the prior art, the remote power transmission means 11 according to the preferred embodiment is in the form of a Bowden cable 11, as shown in FIG. 2, with a core 11', as shown in FIG. 3. From the combination of FIGS. 2 & 3, it can be seen that a corresponding detent pawl lever 12 pulls the core 11' of the Bowden cable 11 for actuating the detent pawl 2 so as to raise it. This takes place of course only when the control unit 7 is "cleared" and, therefore, in the "unlocked" function.

FIG. 2 clearly shows the interior operation of the control unit 7 in a preferred embodiment of the invention. As shown in FIG. 2, there are a Bowden cable 13 leading to an outside door handle, an outside actuation lever 14 actuated by this Bowden cable 13, and a coupling element 15. A central interlock drive has an electric drive motor 16 and a worm gear pair with a drive element 17 which can be driven in two directions. The drive element 17, in one direction, actuates an adjustment element 18 in the direction of the coupled position and the Bowden cable 11 relative to the detent pawl 2. In the opposite direction, the adjustment element 18 is actuated in the direction of the decoupled position, and the detent pawl 2 is released.

Furthermore, there is a Bowden cable 19 connected to the inside door handle, an anti-theft feature drive motor 20 with a corresponding drive element 21 and a coupling journal 22. This construction is described in greater detail in commonly owned, co-pending U.S. patent application Ser. No. 10/129,455, filed May 7, 2002, which is hereby incorporated by reference to the extent necessary to complete an understanding of this feature.

FIG. 3 clearly illustrates that, in this configuration in the lock unit 3, there is at least one component 23 supplied with electricity, which is to be triggered and/or interrogated. In this embodiment, component 23 is a sensor, especially a Hall sensor, for interrogation of the position of a lock latch 1. Alternatively or additionally, it is also possible to provide a sensor for interrogation of the position of the detent pawl 2. Components 23 are necessarily located in the lock unit 3. Since they are electrical/electronic components, they need not only be supplied with power, but the signal must also be interrogated. The associated electronics are located as the lock electronics 8 in the control unit 7. The connection is established by means of an electrical connecting element 24. It is important that the connecting element 24 is integrated into the mechanical power transmission means 11 or is combined with it. In the embodiment shown in FIG. 3, this is indicated by the two-wire connection representing the electrical connecting element 24 being wound as a type of jacket around the Bowden cable representing the power transmission means 11.

A plurality of other embodiments are conceivable, for example, as the integration of a stranded wire, as winding with a foil, as electrically conductive filling of the jacket of the Bowden cable, etc. In the extreme case, it would even be possible to transmit signals via the core of the Bowden cable, therefore, via the actual mechanical power transmission cable.

Figure 4:
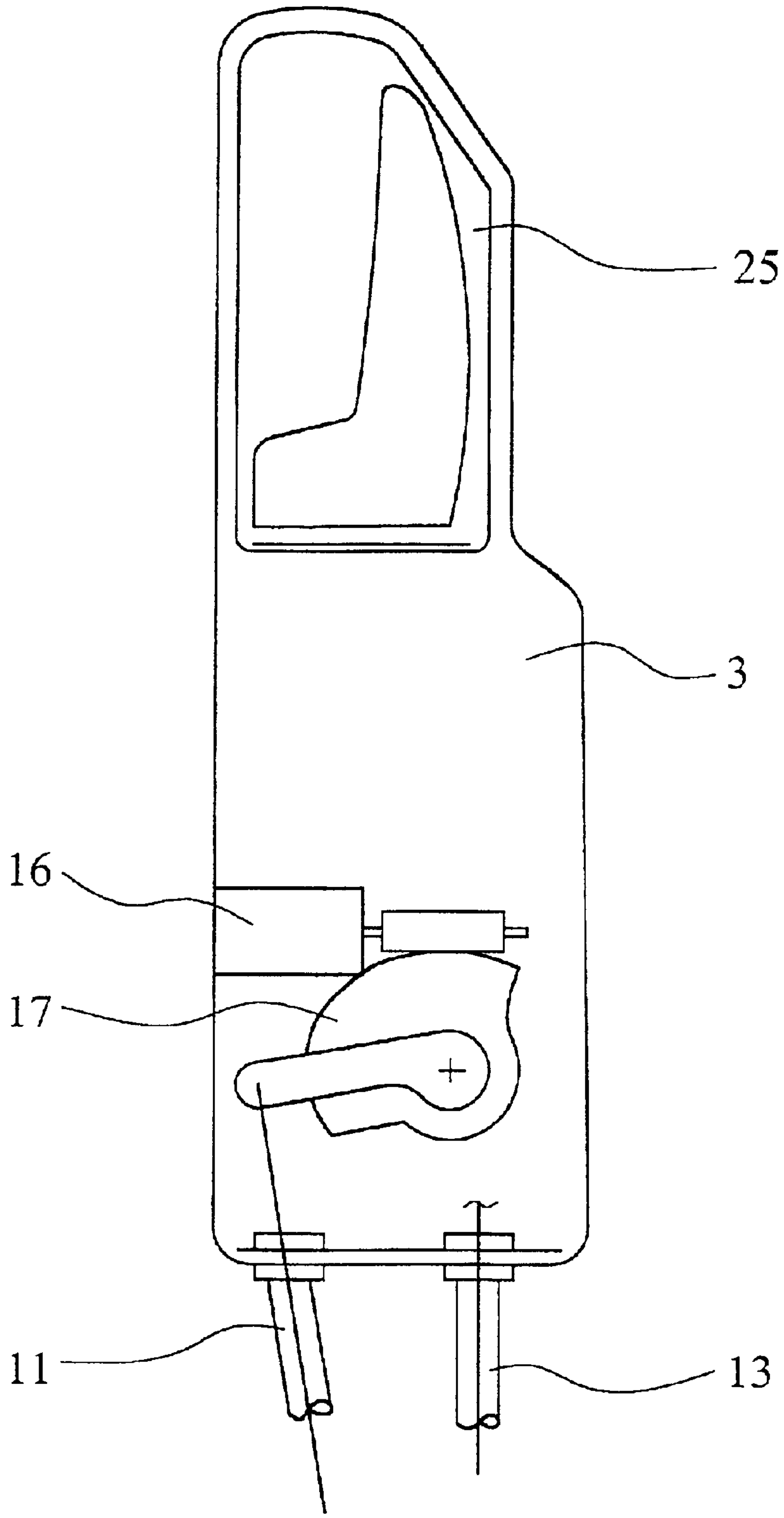
FIG. 4 shows other details in conjunction with an inside door handle arrangement of a motor vehicle door lock of the invention.

FIG. 4 shows another particular feature of the of the invention wherein an inside door handle arrangement 25 is combined with the control unit 7 in an especially integrated fashion. This exploits the fact that the control unit 7 is located anyway away from the lock unit 3 in the dry space where the inside door handle arrangement 25 is already located. Therefore, the two-part nature of the motor vehicle door lock with the lock unit 3 and the control unit 7 can be further optimized in a combination with the inside door handle arrangement 25 as shown. The control unit 7 is shown only schematically here and the "internal operation" can be configured similarly to the embodiment of FIG. 2. It is recognized that the remote power transmission means can feasibly be obviated here.

As another alternative embodiment, which is not further shown, other electrical control functions of the motor vehicle door or hatch are integrated into the lock electronics 8 of the control unit 7, especially for an electrical window raiser, electrical outside mirror adjustment, near-field illumination, and/or speaker control.

As another alternative embodiment, the lock electronics 8 in the control unit 7 integrates other electrical control functions which act outside of the motor vehicle door or hatch, especially for seat adjustment, foot space illumination, and/or blinker control.

Finally, this concept can be further implemented wherein the electric motor drive present in the control unit is configured such that it also executes other functions, especially the function of a central interlock drive, anti-theft feature drive, electric motor-driven locking aid for the lock latch 1 of the lock unit 3, an electric motor-driven opening aid for the detent pawl 2 of the lock unit 3, for an electric window raiser, and/or for an electrically actuated outside mirror. Of course, alternatively, a plurality of electric motor drives can be implemented in the control unit 7, wherein each has different functions, especially the function of a central interlock drive and anti-theft feature drive, an electric motor-driven locking aid for the lock latch 1 of the lock unit 3, an electric motor-driven opening aid for the detent pawl 2 of the lock unit 3, for an electric window raiser, and/or for an electrically actuated outside mirror. What is important is that the control unit 7 can be retrofitted into a type of complete door control device or central electrical door function drive.

Figure 5:
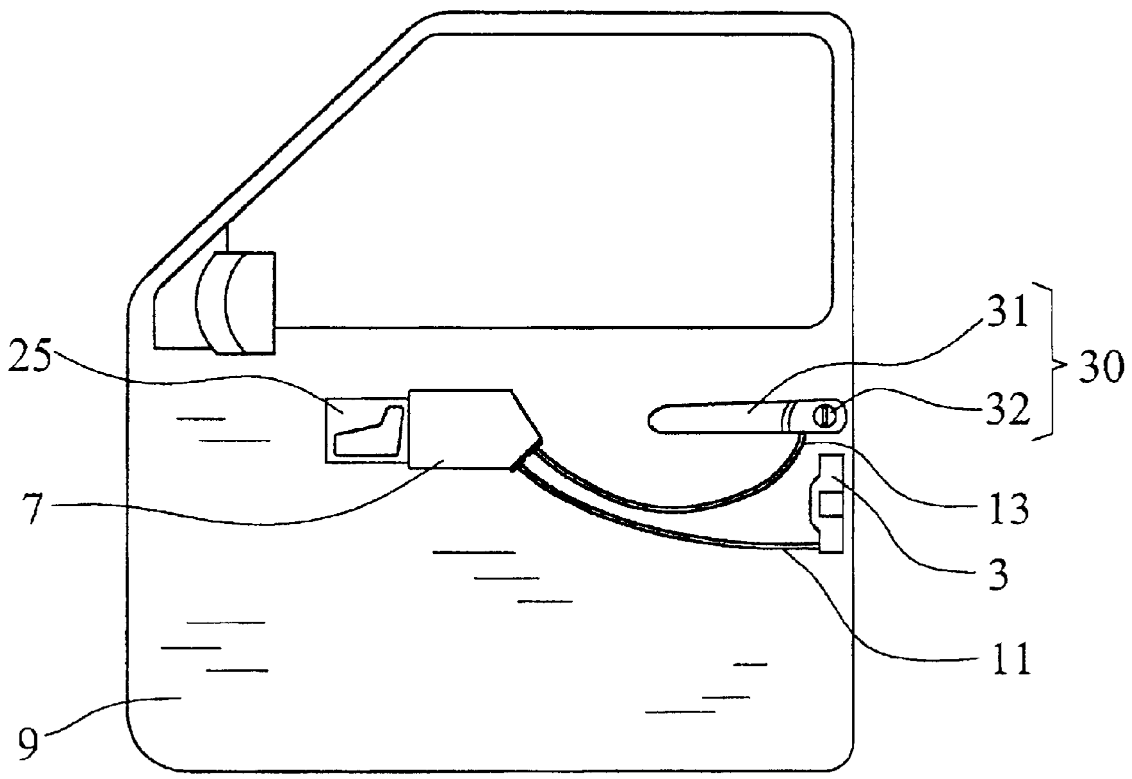
FIG. 5 shows another embodiment of a motor vehicle door lock of the present invention in a motor vehicle side door.

FIG. 5 shows a motor vehicle door lock which has been further optimized in terms of installation technology while retaining the concept of a damp space/dry space separation located in the motor vehicle door 9. Of major importance here is the easily recognizable fact that further optimization of the connection technology has taken place. On the one hand, the inside door handle arrangement 25 has also been combined with the control unit 7, as has been already been described in the embodiment from FIG. 4, wherein construction approaches have been found which make it possible to provide two remote power transmission means, specifically the remote power transmission means 11 between the lock unit 3 and the control unit 7 and the remote power transmission means 13 between the outside door handle arrangement 30 and the control unit 7. The particular features of FIG. 5 are described below.

Figure 6:
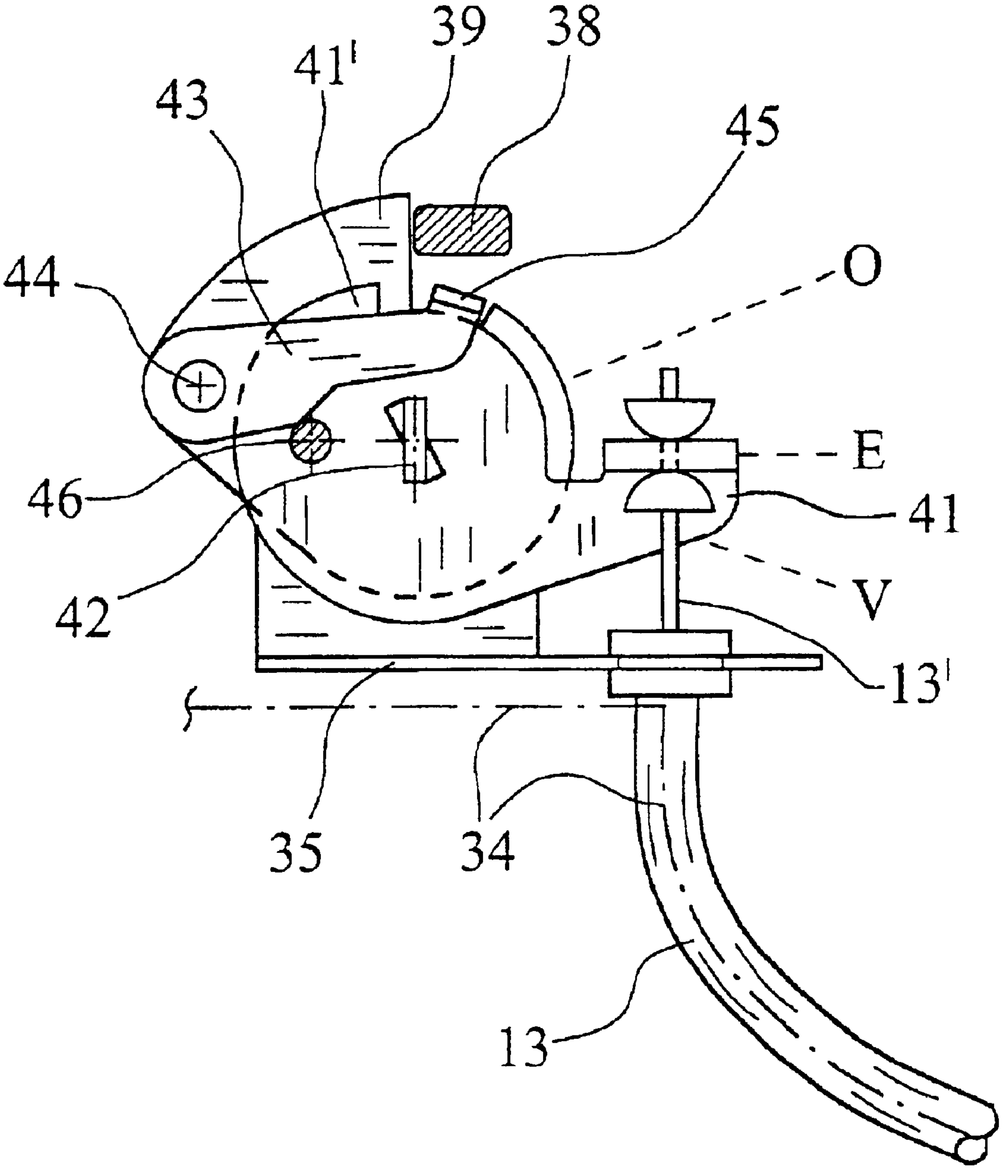
FIG. 6 shows the area of an outside door handle arrangement of the motor vehicle door lock from FIG. 5.
Figure 7:
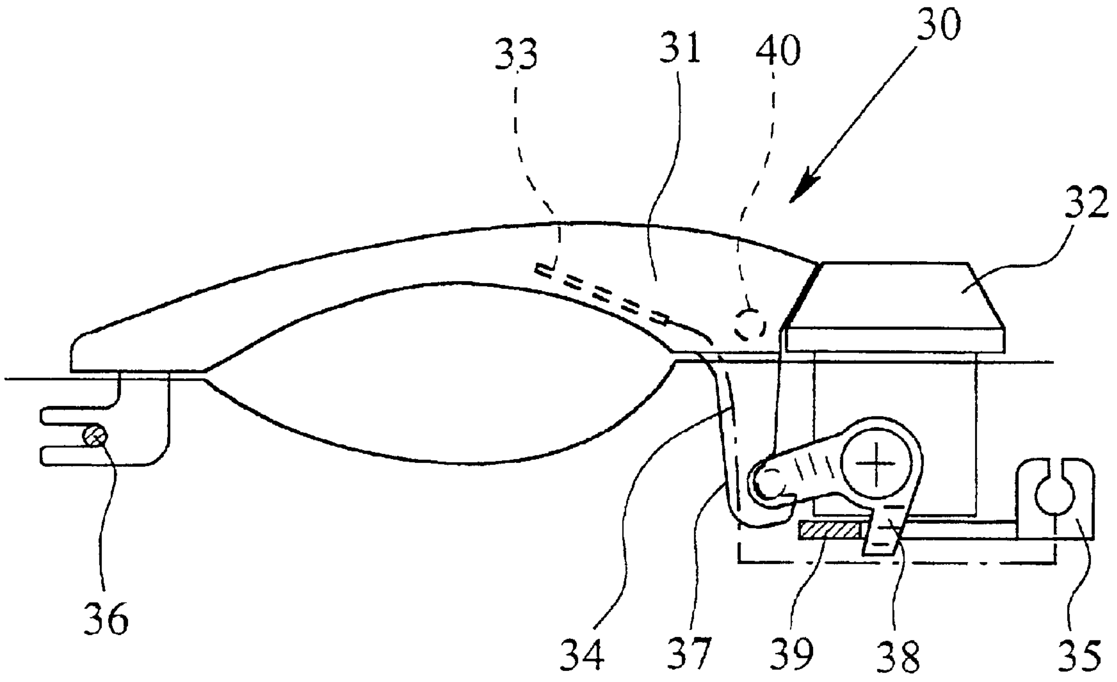
FIG. 7 shows the area of the outside door handle arrangement of the motor vehicle door lock from FIG. 5 with a representation of an outside door handle and a lock barrel.

In particular, FIG. 5 in conjunction with FIG. 6 and FIG. 7 shows that the outside door handle arrangement 30, provided with the outside door handle 31 and lock barrel 32, is mechanically connected solely to the control unit 7, not to the lock unit 3. The lock barrel 32 is normally located on the front side door, especially the driver's door.

In conjunction with the outside door handle arrangement 30, at least one component 33, especially a sensor, supplied with electricity to be triggered and/or to be interrogated, can be used. The embodiment shown in FIGS. 6 & 7 clearly shows that the component 33 is electrically connected by means of the electrical connecting element 34 to the lock electronics 8 in the control unit 7, and is integrated into the mechanical remote power transmission means 13, or is combined with it. The embodiment shown illustrates the electrical connecting element 34 as a dot-dash line. The electronic component 33 here is a sensor in the stationary outside door handle 31.

In particular, FIGS. 5 & 6 show in combination that the remote power transmission means 13 is made, not only as a tension/compression power transmission means, but also, as shown, it can be used for construction purposes. To do this, on the outside door handle arrangement 30, there is a holder 35 on which the remote power transmission means 13, i.e., a Bowden cable, is fixed with its outside jacket. The remote power transmission means 13, with the core 13' of the Bowden cable, is coupled on the outside door handle arrangement 30 both to the outside door handle 31 and also to the lock barrel 32. This embodiment indicates with the broken position lines that the remote power transmission means 13, as well as cable 13', can be moved by the action of a force on the outside door handle arrangement 30 from the middle position for the "unlocked" (E) function by pulling into the position for the "open" (O) function, by pressing into the position for the "locked" (V) function and by pulling from the "locked" (V) position into the "unlocked" (E) position.

The function described here is a so-called "push-pull function" which is longstanding in the structural configuration of inside door handle arrangements. This "push-pull" function here has the particular feature that the change of position "locked"/"unlocked" and vice versa can be carried out both from the lock barrel 32 and also for example from the central interlock drive from the control unit 7, while the "open" function is triggered from the outside door handle 31, if the lock mechanism 5 is in the "unlocked" operating position.

The above explained construction can be easily used in a classical motor vehicle door lock with an electromechanical configuration in a central interlock drive, anti-theft feature drive, sensors and control electronics with a detent pawl 2 actuated mechanically by actuating the outside door handle 31.

Recently there have been developments which lead to a "passive entry" function with electrically triggered actuation of the detent pawl 2. The control unit 7 would have an auxiliary opening drive. This concept a so-called open-by-wire (OBW) drive.

In the above explained embodiment, an outside stationary door handle 31 can be used simply by deformation, by proximity detection, by contact or the like which executes a signal triggering for the lock electronics. The outside door handle 31 function can also be mechanically activated an emergency situation when the electronics fail.

FIG. 7 shows a design characterized in that the outside door handle 31 is movably supported on the outside door handle arrangement 30, but normally is fixed immovably on the outside door handle arrangement 30. Further, it is characterized in that the fixing of the outside door handle 31 can be released by manual manipulation and that normally the opening function of the motor vehicle door lock can be electronically triggered by means of the OBW function.

The example shown in FIG. 7 shows the outside door handle 31 on the left pivotally supported on the swivel bearing 36. On the right near the lock barrel 32 a draw hook 37 is connected to the reversing lever 38 which deflects the pulling motion of the outside door handle 31 into a swiveling motion running transversely thereto. The swiveling motion of the reversing lever 38 acts on an actuating element 39 of the outside door handle arrangement 30 as explained below.

The component 33 is a piezoelectric deformation sensor and its electrical connecting element 34 is shown by a dot-dash line and leads to the holder 35 where it then enters the jacket of the remote power transmission means 13 or runs along the jacket, as previously explained.

It is interesting that the outside door handle 31, as explained above, is normally fixed on the outside door handle arrangement 30, and is therefore immovable. A fixing element 40 which is only suggested and which can be a blocking pin which can be removed by hand and which can be inserted again can be used for this purpose. By manipulation by hand from the outside, the outside door handle 31 can be released from its fixed, stationary position by pulling, pressing or swiveling the fixing element 40 so that the outside door handle 31 then can be moved like a normal mechanical outside door handle. If the motor vehicle door lock is in the "unlocked" operating position, door opening can take place by mechanical actuation; this can be of great importance as a safety factor if the electrical power supply fails.

The motor vehicle door lock is switched between the "unlocked" and "locked" operating positions both from the lock barrel 32 and also within the lock mechanism 5 in the control unit 7.

For rear side doors and other versions of the motor vehicle door lock without the lock barrel 32, switching takes place between "unlocked" and "locked" only from the control unit 7. The corresponding applies to the circuits in the anti-theft position wherein the inside door handle arrangement 25 is rendered inoperative.

The above explained concept can be implemented on the outside door handle arrangement 30 in difference ways. The embodiment shown in FIG. 6 shows a rather structurally simple and feasible version. On the outside door handle arrangement 30, several operating elements are coaxially supported, specifically a coupling element 41 for coupling of the remote power transmission means 13, as well as the core 13' of the Bowden cable, the already explained actuation element 39 for actuation from the outside door handle 31 and the lock barrel 32. A paddle 42 of the lock barrel 32 can be seen in the middle of the coupling element 41.

The actuation element 39 can be coupled to the coupling element 41 by means of an ejectable coupler 43. The coupler 43 is pivotally supported on the actuation element 39 on an axis 44 and fits with a projection 45 into an edge recess of the coupling element 41. In the coupled position shown in FIG. 6, the rotary motion of the actuation element 39 is transferred around the common axis via the projection 45 to the coupling element 41, on its driver edge 41'.

On the coupling element 41, there is an ejector 46 in the form of a journal. If the coupling element 41 is moved from the "unlocked" position into the "locked" position, the coupler 43 is pivoted by means of the ejector 45, counterclockwise around the axis 44, so that the projection 45 is deflected radially to the outside. Then, power transfer from the actuating element 39 to the coupling element 41 is interrupted. The outside door handle 31 would be moved optionally in an idle stroke.

Overall, if all influencing factors which have been explained above are implemented jointly, the configuration of the motor vehicle door lock or the motor vehicle door lock arrangement which is very simple from the connections and which is shown in FIG. 5 is possible.

In terms of production technology it is of course natural if a symmetrical arrangement of the component locks is implemented so that optional installation on the right or left side of the body of a motor vehicle is possible.

What we claim is:

1. Motor vehicle door lock comprising:

a lock unit with mechanical lock elements including a lock latch and a detent pawl, and a lock mechanism with interacting elements in a control unit, said control unit being arranged at a spatially separate location from the lock unit in or on a motor vehicle door or hatch, wherein the lock unit is arranged on a motor vehicle door or hatch, wherein the lock unit is connected to the control unit by means of a remote power transmission means, wherein the detent pawl in the lock unit is mechanically actuated from an element of the lock mechanism in the control unit by means of the remote power transmission means, wherein an outside door handle arrangement is provided with an outside door handle, wherein the outside door handle are mechanically connected solely to the control unit by means of a second remote power transmission means so that the locking elements are actuated from the outside door handle only via the control unit, and wherein the remote power transmission means is a tension/compression power transmission means, wherein the second remote power transmission means comprises a Bowden cable having a core coupled both to the outside door handle and to a lock barrel of the outside door handle arrangement, wherein the core of the Bowden cable is movable from a middle position for an "unlocked" function into a position for an "open" function by pulling and into a position for a "locked" function by pressing, and is movable from the position for the "locked" function into the position for the "unlocked" function by pulling.

2. The motor vehicle door lock as claimed in claim 1, wherein said outside door handle is adapted to produce said pulling of the core of the Bowden cable movement into the position for the "open" function.

3. The motor vehicle door as claimed in claim 1, wherein movement of the Bowden cable into the positions of the "unlocked" and "locked" positions is producible by actuating either of the lock barrel and the remote power transmission means from the lock mechanism in the control unit.

4. The motor vehicle door as claimed in claim 1, wherein a coupling element for coupling to the core of Bowden cable of the second remote power transmission means, an actuation element for actuation from the outside door handle, and the lock barrel that are coaxially supported on the outside door handle arrangement, and wherein the actuation element is coupled to the coupling element by an ejectable coupler.

5. The motor vehicle door lock as claimed in claim 1, wherein in or on an outside door handle arrangement there is at least one electrical sensor component for determining the position of the outside door handle, wherein the sensor component is electrically connected by means of an electrical connecting element to lock electronics in the control unit, and wherein the electrical connecting element is integrated or combined into the mechanical power transmission means.

6. The motor vehicle door lock as claimed in claim 5, wherein the outside door handle is movably supported on the outside door handle arrangement in a manner releasably fixed against movement thereof, wherein the fixing of the outside door handle is releasable by manual manipulation, and wherein the motor vehicle door lock is adapted to be electronically triggered in an open-by-wire manner.

* * * * *